(12) United States Patent
Champa (10) Patent No.: US 11,902,702 B2
(45) Date of Patent: Feb. 13, 2024

(54) FLEET WIDE VIDEO SEARCH

(71) Applicant: Omnitracs, LLC, Dallas, TX (US)

(72) Inventor: Jeff Champa, Dallas, TX (US)

(73) Assignee: Omnitracs, LLC, Dallas, TX (US)

( * ) Notice: Subject to any disclaimer, the term of this patent is extended or adjusted under 35 U.S.C. 154(b) by 47 days.

(21) Appl. No.: 16/105,555

(22) Filed: Aug. 20, 2018

(65) Prior Publication Data

US 2020/0059626 A1 Feb. 20, 2020

(51) Int. Cl.
*H04N 5/775* (2006.01)
*G06F 16/738* (2019.01)
*G06F 16/78* (2019.01)
*G06F 16/9537* (2019.01)

(52) U.S. Cl.
CPC .......... *H04N 5/775* (2013.01); *G06F 16/738* (2019.01); *G06F 16/7867* (2019.01); *G06F 16/9537* (2019.01)

(58) Field of Classification Search
CPC ... H04N 5/775; G06F 16/738; G06F 16/7867; G06F 16/9537
See application file for complete search history.

(56) References Cited

U.S. PATENT DOCUMENTS

| | | | |
|---|---|---|---|
| 8,107,677 B2 | 1/2012 | Angell et al. | |
| 9,594,725 B1 * | 3/2017 | Cook | G06F 3/0482 |
| 10,847,187 B1 * | 11/2020 | Hoye | G11B 27/19 |
| 11,151,192 B1 * | 10/2021 | Campbell | H04N 7/183 |
| 2005/0099498 A1 * | 5/2005 | Lao | H04N 5/765 |
| | | | 348/207.99 |
| 2007/0198951 A1 * | 8/2007 | Frank | G06F 16/9537 |
| | | | 707/E17.026 |
| 2008/0066102 A1 * | 3/2008 | Abraham | H04N 21/4316 |
| | | | 725/37 |
| 2010/0085431 A1 * | 4/2010 | Trapani | B60R 25/102 |
| | | | 348/148 |
| 2013/0023229 A1 * | 1/2013 | Messerly | H04W 4/023 |
| | | | 455/404.2 |
| 2013/0129307 A1 * | 5/2013 | Choe | H04N 5/2621 |
| | | | 386/227 |
| 2013/0285803 A1 * | 10/2013 | Kang | G07C 5/0866 |
| | | | 340/436 |

(Continued)

FOREIGN PATENT DOCUMENTS

KR 101675306 B1 11/2016

OTHER PUBLICATIONS

International Search Report and Written Opinion issued in International Application No. PCT/US2019/045143 dated Nov. 14, 2019.

*Primary Examiner* — Sunghyoun Park
(74) *Attorney, Agent, or Firm* — ArentFox Schiff LLP (57) ABSTRACT

Methods and devices for requesting videos may include performing a search for one or more vehicles that have a camera system located nearby an event during a time range surrounding the event. The methods and devices may include receiving a selection of at least one vehicle from a search result list including the one or more vehicles. The methods and devices may include retrieving, from a video data repository associated with the at least one vehicle, a requested video during the time range surrounding the event. The methods and devices may include displaying the requested video.

19 Claims, 7 Drawing Sheets

(56) References Cited

U.S. PATENT DOCUMENTS

| | | | |
|---|---|---|---|
| 2015/0081207 A1* | 3/2015 | Briant | G06F 16/9537 |
| | | | 701/410 |
| 2015/0105934 A1* | 4/2015 | Palmer | G07C 5/12 |
| | | | 701/1 |
| 2017/0257602 A1 | 9/2017 | Axson et al. | |
| 2017/0300503 A1* | 10/2017 | Wang | H04L 67/327 |
| 2017/0316685 A1* | 11/2017 | Yun | G08G 1/162 |
| 2018/0218582 A1* | 8/2018 | Hodge | G06F 16/7837 |
| 2019/0318013 A1* | 10/2019 | Leka | G06F 16/2457 |

* cited by examiner

FLEET WIDE VIDEO SEARCH

BACKGROUND

The present disclosure relates to video recording and monitoring activities surrounding a vehicle.

Drivers of vehicles, and in particular professional drivers of tractor trailers in a fleet, may face many challenges safely navigating vehicles through traffic, congestion, weather and various road conditions. Fleet owners may want to record and monitor activities inside and outside of fleet vehicles while drivers are operating fleet vehicles. Fleet owners may use the video to provide driver training to help prevent future risky behaviors. However, the video may not capture entire events.

Thus, there is a need in the art for improvements in video recording and monitoring activities of vehicles.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a memory to store data and instructions, a processor in communication with the memory, and a video manager in communication with the memory and the processor. The video manager may be operable to perform a search for one or more vehicles that have a camera system located nearby an event during a time range surrounding the event; receive a selection of at least one vehicle from a search result list including the one or more vehicles; retrieve, from a video data repository associated with the at least one vehicle, a requested video during the time range surrounding the event; and display the requested video.

Another example implementation relates to a method for requesting additional videos. The method may include performing a search for one or more vehicles that have a camera system located nearby an event during a time range surrounding the event. The method may include receiving a selection of at least one vehicle from a search result list including the one or more vehicles. The method may include retrieving, from a video data repository associated with the at least one vehicle, a requested video during the time range surrounding the event. The method may include displaying the requested video.

Another example implementation relates to computer-readable medium storing instructions executable by a computer device. The computer-readable medium may include at least one instruction for causing the computer device to perform a search for one or more vehicles that have a camera system located nearby an event during a time range surrounding the event. The computer-readable medium may include at least one instruction for causing the computer device to receive a selection of at least one vehicle from a search result list including the one or more vehicles. The computer-readable medium may include at least one instruction for causing the computer device to retrieve, from a video data repository associated with the at least one vehicle, a requested video during the time range surrounding the event. The computer-readable medium may include at least one instruction for causing the computer device to display the requested video.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

An owner or manager of one or more vehicles, such as a fleet owner, may want to record and monitor activities inside and outside of the vehicle while drivers are operating the vehicles. While the present disclosure will be discussed using examples relating to a fleet owner and one or more fleet vehicles, it should be understood that the systems and methods described may be utilized by any vehicle owner to monitor driver activity of any vehicle.

For example, fleet owners or managers may want to view video during critical driving events, such as, but not limited to, hard braking, speeding, hard turns, and collisions. By seeing what drivers experience during critical driving events, or at specific dates and times, fleet owners may better understand exactly what occurred. In addition, fleet owners may use the video to provide driving training to help prevent future risky behaviors. In case of an accident or incident fleet owners may quickly determine what caused the incident. The systems and methods may provide video cameras inside and outside the cabin of a fleet vehicles so that video and/or audio monitoring capabilities may be provided inside and outside the vehicle during a critical event to capture the conditions external to the vehicle and the corresponding behavior of a driver during a critical event.

However, the video may not capture the entire event and/or may not be able to provide enough information to identify a cause of the event. This disclosure relates to devices and methods for searching for videos captured by a camera system on one or more vehicles located nearby an event. When an event, such as a critical event occurs, video captured by the vehicle involved in the event may not identify a cause of the event. In addition, the vehicles involved in the critical event may not have video recording capabilities. Thus, a video may not exist for the critical event. However, there may be additional trucks with video recording capabilities located near the area at the time of the event. As such, videos captured by the one or more trucks located nearby the event may provide an alternative view of the event and/or may have captured additional relevant information for the event.

The devices and methods may perform a search to determine whether any additional vehicles were located in the area at the time of the event. For example, by analyzing position data of the vehicles equipped with video recording systems, the devices and methods may identify one or more vehicles located in the area of the event. A notification may be sent to users of the system that videos may be available for the event.

The devices and methods may request video from the one or more trucks identified in the area of the event. For example, users of the system may select one or more vehicles identified in the search as being located nearby the event to request videos from. In addition, the system may automatically select videos from the one or more vehicles identified in the search as being located nearby the event.

As such, the devices and methods may allow users to search for videos captured by camera systems of other fleet vehicles that may be located nearby an event and/or requested location. The videos captured may provide an alternative view of the event or location and/or may have captured additional relevant information for the event. Thus, users may receive reliable information to help identify a cause of the event, help defend a driver who was involved in an accident, and/or to identify unacceptable driving behaviors.

Figure 1:
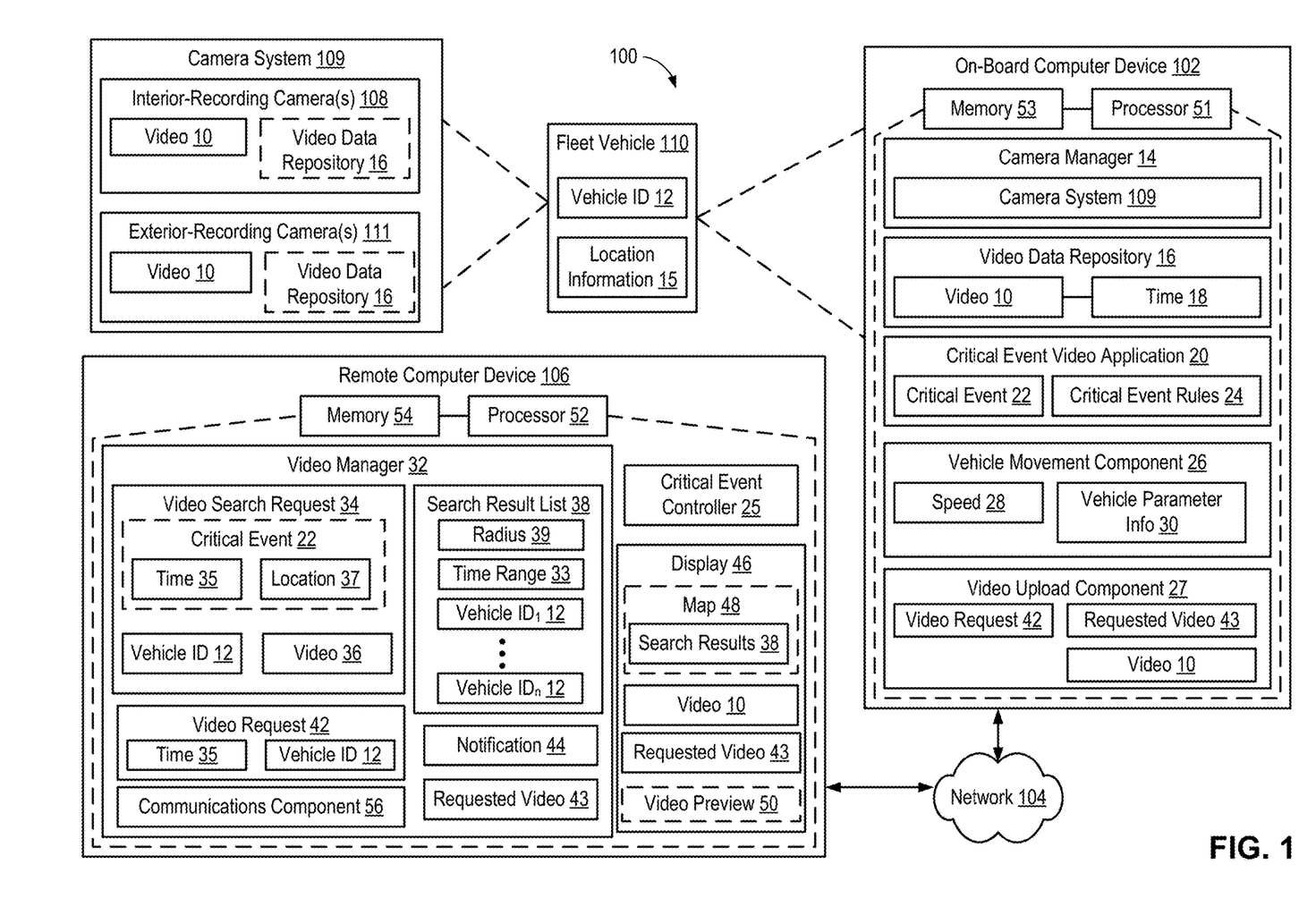
FIG. 1 is a schematic block diagram of an example system for recording and monitoring vehicle activity in accordance with an implementation of the present disclosure.

Referring now to FIG. 1, a system 100 for video recording and monitoring activities inside and outside of a vehicle may include one or more fleet vehicles 110 with at least one on-board computer device 102 having a camera manager 14 for controlling the recording and storage of video (and, optionally, audio) of the environment inside and/or around fleet vehicle 110 by a camera system 109. Camera system 109 may include one or more interior-recording cameras 108 and/or one or more exterior recording cameras 111 for recording video 10. Interior-recording cameras 108 and/or exterior recording cameras 111 may include, but are not limited to, a forward-facing camera, a rear-facing camera, 360 degree cameras, dual cameras (e.g., an integrated interior-recording camera 108 and exterior-recording camera 111), and/or mirror mounted cameras. In some cases, camera manager 14 may operate in coordination with a critical event video application 20, which may additionally control the recording and storage of video 10 (and, optionally, audio) of the environment inside and/or around fleet vehicle 110 by camera system 109.

On-board computer device 102 may include a processor 51 and/or memory 53. An example of processor 51 can include, but is not limited to, any processor specially programmed as described herein, including a controller, microcontroller, application specific integrated circuit (ASIC), field programmable gate array (FPGA), system on chip (SoC), or other programmable logic or state machine. An example of memory 53 can include, but is not limited to, a type of memory usable by a computer, such as random access memory (RAM), read only memory (ROM), tapes, magnetic discs, optical discs, volatile memory, non-volatile memory, and any combination thereof.

On-board computer device 102 may include any mobile or fixed computer device, which may be connectable in a wired or wireless manner to communication over one or more networks 104. On-board computer device 102 may be, for example, a computer device such as a desktop or laptop or tablet computer, a cellular or satellite telephone, a gaming device, a mixed reality or virtual reality device, a music device, a television, a navigation system, a camera, a personal digital assistant (PDA), a handheld communication device, or any other computer device having wired and/or wireless connection capability with one or more other devices or networks. For example, in some implementations, on-board computer device 102 may be an electronic logging device (ELD), an Omnitracs Enterprise Services platform device, such as an Intelligent Vehicle Gateway (IVG) device, or an Omnitracs XRS platform device, each offered by Omnitracs, LLC of Dallas, TX.

Network 104 may provide one or more types of communication connections, such as any type of wired or wireless airlink, to on-board computer device 102, fleet vehicle 110, interior-recording camera(s) 108, and/or exterior-recording camera(s) 111. For example, interior-recording camera 108 and/or exterior-recording camera(s) 111 may communicate over a wireless connection, such as a WiFi or Bluetooth connection, or over a wired connection, with on-board computer device 102. Correspondingly, on-board computer device 102 may communicate over a WiFi or cellular or satellite connection with network 104.

In addition, network 104 allows on-board computer device 102 to communicate with one or more remote computer devices 106. In one use case, remote computer device 106 may be a server associated with a network management center run by an operator of system 100, or remote computer device 106 may be a computer device of a vehicle owner, fleet owner, or fleet manager. In either case, the one or more remote computer devices 106 may be used to configure the operation of camera manager 14 and/or critical event video application 20, and/or to receive the resulting recorded video 10 (and/or audio) for storage and/or analysis, such as via communications component 56 and network 104 based on operation of video manager 32 and/or critical event controller 25. In this case, video manager 32 and critical event controller 25 may be computer-implemented instructions, logic, hardware, firmware, or any combination thereof that enable interfacing with, sending commands and configuration data to, and/or receiving recorded video and/or audio or other vehicle-parameter-related data from, on-board computer device 102. Video manager 32 and critical event controller 25 may be stored and executed by a combination of memory 54 and processor 52 of remote computer device 106.

Fleet vehicles 110 may include a group of one or more vehicles owned or leased by a business, government agency, or other organization or individual. Each fleet vehicle 110 may include a vehicle identification (ID) 12 and location information 15 that may be used by the owner of fleet vehicles 110 to monitor and/or track the position data of fleet vehicles 110.

Fleet vehicle 110 may also include a camera system 109 of one or more cameras, such as interior-recording camera(s) 108 and/or exterior-recording camera(s) 111. For example, interior-recording camera(s) 108 may be located on fleet vehicle 110 to record the environment inside fleet vehicle 110 (e.g., positioned to record one or more of the driver, the passenger, the dashboard, on-board computer device 102, or anything inside the cab) and exterior-recording camera(s) 111 may be located on fleet vehicle 110 to record the environment outside of fleet vehicle 110 (e.g., positioned to record one or more of an area in front of the vehicle (including the road, other vehicles, etc.), the areas at the sides of the vehicle, or the area behind the vehicle). As such, camera system 109 may record and monitor activities inside and/or outside fleet vehicle 110. In an aspect, fleet vehicle 110 may include a dual camera (e.g., an integrated interior-recording camera 108 and exterior-recording camera 111) located inside a cabin of fleet vehicle 110 so that the dual camera may record and monitor activities inside the cabin of fleet vehicle 110 (e.g., driver behavior) and may record and monitor activities outside the cabin of fleet vehicle 110 (e.g., road and environmental conditions, and activity of other vehicles near fleet vehicle 110).

On-board computer device 102 may include a camera manager 14 operable to control a recording status of each of the one or more interior-recording camera(s) 108 and/or exterior-recording camera(s) 111. Each of the one or more interior-recording camera(s) 108 and/or exterior-recording camera(s) 111 may be controlled independently. In addition, each of the one or more interior-recording camera(s) 108 and/or exterior-recording camera(s) 111 may also maintain a recording status that indicates whether each of the one or more interior-recording camera(s) 108 and/or exterior-recording camera(s) 111 is on and recording information or is off and is not recording information.

Camera manager 14 may apply one or more rules in determining a recording status of each of the one or more interior-recording camera(s) 108 and/or exterior-recording camera(s) 111. The one or more rules may be based on, for example, a duty status of a driver of fleet vehicle 110. A duty status may include, but is not limited to, on duty, on duty driving, off duty, off duty driving, sleeper berth, and unknown. For example, the camera manager 14 may turn the recording status of the one or more interior-recording camera(s) 108 and/or exterior-recording camera(s) 111 to on when the duty status is one or more of on duty and on duty driving.

The one or more rules may also be based on a driving status of fleet vehicle 110. Vehicle movement component 26 may receive one or more indicators of the movement state from fleet vehicle 110 to indicate whether fleet vehicle 110 is moving. For example, vehicle movement component 26 may receive the movement state in the form of a speed 28 of fleet vehicle 110. In addition, vehicle movement component 26 may receive vehicle parameter information 30, such as, but not limited to, velocity or acceleration, or an indirect vehicle movement-related parameter, such as a brake status. Vehicle movement component 26 may receive the movement state information and/or vehicle parameter information 30 from one or more monitoring or control devices, such as a controller area network (CANbus) system and/or an Electronic Control Module (ECM), located on fleet vehicle 110. Vehicle movement component 26 may use the received speed 28 information and/or vehicle parameter information 30 to determine the movement state of fleet vehicle 110. For example, the camera manager 14 may turn the recording status of the one or more interior-recording camera(s) 108 and/or exterior-recording camera(s) 111 to on when the driving status of the fleet vehicle is moving.

As mentioned above, on-board computer device 102 may also include critical event video application 20 operable to cause video 10 (and audio) to be recorded, and to enable retrieval of recorded video 10 (and audio) from interior-recording camera(s) 108 and/or exterior-recording camera(s) 111. For example, critical event video application 20 may be configured with one or more critical event rules 24 that trigger interior-recording camera(s) 108 and/or exterior-recording camera(s) 111 to record video 10 (and/or audio). Critical event rules 24 may include detection of one or more critical events 22 associated with the operation of fleet vehicle 110. Suitable examples of a critical event 22 may include, but are not limited to, one or any combination of a collision, hard braking, the use of the anti-lock braking system (ABS), roll stability state, a lane departure warning, and a following time violation. A following time violation may include when a quotient of a distance to the vehicle in front of the fleet vehicle 110 (as measured by, for example, a radar system) divided by the speed of fleet vehicle 110 is less than a configurable number of seconds for a configurable period of time (e.g., 2 seconds for 2 minutes).

Critical event rules 24 may additionally include rules on a how long recording should be maintained, and/or rules on uploading or providing access to the recorded video (and/or audio). Further, critical event rules 24 may specify other vehicle parameter information 30 that is to be collected (e.g., from a CANbus or ECM) along with the video 10 and/or audio from one of more interior-recording cameras 108 and/or exterior-recording cameras 111.

On-board computer device 102 may also include a video data repository 16 that stores the video 10 recorded by interior-recording camera(s) 108 and/or exterior-recording camera(s) 111. The videos 10 may be associated with a time 18 when the video 10 was recorded. For example, video data repository 16 may store videos 10 for predetermined period of time (e.g., 5-7 days) before deleting the videos 10 from video data repository 16. In an implementation, video data repository 16 may be located on interior-recording camera(s) 108 and/or exterior-recording camera(s) 111.

Video manager 32 at remote computer device 106 may generate a video request 42 for videos 10 to be sent to on-board computer device 102 in response to a user request. For example, the user request may be for a video 10 associated with a critical event 22 and/or for a video 10 associated with a specific date/time 35. In addition, the user request for video may identify a specific fleet vehicle 110 by providing, for example, the vehicle ID 12. In some cases where interior-recording camera(s) 108 and/or exterior-recording camera(s) 111 may be recording continuously, the amount of video 10 retrieved before and/or after a critical event 22 may be configured by a user or may be predetermined by video manager 32, critical event controller 25, and/or critical event video application 20. For example, a 30 minute video may be retrieved with a portion of the video extending before the critical event 22 and a portion of the video extending after the occurrence of the critical event 22.

On-board computer device 102 may include a video upload component 27 that may receive the video request 42 from remote computer device 106. Video upload component 27 may retrieve the video 10 associated with the requested time 35 from the video data repository 16 and may transmit the requested video 43 to remote computer device 106.

In an implementation, critical event video application 20 may retrieve videos 10 automatically from the video data repository 16 upon the occurrence of one or more critical events 22. Critical event video application 20 may communicate with video upload component 27 to upload video 10 to remote computer device 106 automatically upon the occurrence of one or more critical events 22. Thus, fleet owners or managers, via operation of video manager 32 at remote computer device 106, may receive reliable information quickly to help identify a cause of the critical event 22, help defend a driver who was involved in an accident, and/or to identify unacceptable driving behaviors.

When a critical event 22 occurs, the video 10 from the fleet vehicles 110 involved in the critical event 22 may not capture the entire event and/or may not show the information needed to completely identify a cause of the critical event 22. For example, the cause of the critical event 22 may be obstructed on the video 10. In addition, the fleet vehicle(s) 110 involved in the critical event 22 may not have video recording capabilities. As such, a video may not exist for the critical event 22. However, there may be additional fleet vehicles 110 with video recording capabilities in the area at the time 35 of the critical event 22. As such, videos 36 captured by the one or more fleet vehicles 110 may provide an alternative view of the critical event 22 and/or may have captured additional relevant information for the critical event 22.

Video manager 32 may also generate a video search request 34 to search for videos 36 captured by a camera system 109 on one or more fleet vehicles 110 located nearby a critical event 22. For example, video manager 32 may receive the time 35 and location 37 of the critical event 22 automatically from critical event controller 25 and may automatically perform the video search request 34 for videos 36 upon the occurrence of the critical event 22. In addition, video manager 32 may perform the video search request 34 for videos 36 in response to a user request. For example, the user request may be for videos 36 associated with a critical event 22 and/or for videos 36 associated with a specific date and/or time 35 regardless of whether a critical event 22 occurred.

Video manager 32 may analyze position data of fleet vehicles 110 equipped with camera systems 109 to identify whether any fleet vehicles 110 were located nearby the area of the critical event 22 when the critical event 22 occurred. Fleet vehicles 110 in the area may be from the same company and/or organization of the fleet vehicle(s) 110 involved in the critical event 22 and/or may be from different companies and/or organizations of the fleet vehicle(s) 110 involved in the critical event 22. As such, the videos 36 may come from a third party not involved in the critical event 22.

For example, video manager 32 may compare the location 37 and time 35 information included in the video search request 34 with the location information 15 of the fleet vehicles 110 associated with the system 100. In an implementation, a radius 39 from the critical event location 37 may be set (e.g., a half mile or a mile) to search within when identifying which fleet vehicles 110 are nearby the critical event location 37. In addition, a time range 33 (e.g., one minutes) extending before and/or after the time 35 when the critical event 22 occurred may also be used whining searching for which fleet vehicles 110 may have been nearby when the critical event 22 occurred.

The radius 39 and/or time range 33 may be configurable by users of the system. For example, the radius 39 may be expanded to receive additional search results and/or narrowed to reduce the search results. In addition, the time range 33 may be increased to include additional search results and/or may be decreased to reduce the search results. For example, the time range 33 may be expanded to 20 minutes after the critical event 22 occurred if a user wanted videos 36 to show events that may have occurred before an office arrived at the critical event location 37.

When the location information 15 of a fleet vehicle 110 is within a radius 39 of the critical event location 37 and within a time range 33 of the time 35 of when the critical event 22 occurred, the vehicle ID 12 of the fleet vehicle 110 may be added to a search result list 38. As such, the search result list 38 may include one or more vehicles IDs 12 of fleet vehicles 110 that were in the area nearby the critical event location 37 when the critical event 22 occurred.

In an implementation, video manager 32 may send a notification 44 to users of the system indicating that videos 36 may be available for the critical event 22. For example, video manager 32 may e-mail the search result list 38 and/or provide access to a map 48 displaying the fleet vehicles 110 that were located nearby the critical event 22 during a time range 33 surrounding the critical event 22. Users may review the locations of the fleet vehicles 110 included in the search result list 38 and may decide whether to request video 36 for the critical event 22 based upon the information provided in the search result list 38.

Display 46 may present the search result list 38 so that users may see the location information 15 of the fleet vehicles 110 relative to the critical event location 37. In an implementation, the search result list 38 may be presented in the form of a map 48 illustrating a location of the one or more fleet vehicles 110 relative to the critical event location 37. Map 48 may be an interactive map displaying the one or more fleet vehicles 110 included in the search result list 38. Users may select one or more fleet vehicles 110 to request the video 36 from using map 48. In addition, users may modify the time range 33 and/or radius 39 of the search results list 38 illustrated on the map 48.

For example, the map 48 may display a fleet vehicle 110 following behind the fleet vehicle(s) 110 involved in the critical event 22 and another fleet vehicle 110 travelling in an opposite direction of the fleet vehicles (s) 110 involved in the critical event 22. As such, a user of the system may want to request video 36 from the fleet vehicle 110 following behind the fleet vehicle(s) 110 involved in the critical event 22 but may not want to request video 36 from the fleet vehicle travelling in the opposite direction of the critical event 22.

Video manager 32 may receive the selected vehicle ID(s) 12 for requesting the videos 36. In an implementation, video manager 32 may automatically select one or more vehicle IDs 12 from the search result list 38 for requesting the videos 36 upon the occurrence of the critical event 22. Video manager 32 may prepare one or more video requests 42 to send to the selected vehicles IDs 12. Video upload component 27 associated with on-board computer device 102 may receive the video request 42 from video manager 32 and may retrieve the video 10 associated with the requested time 35 from the video data repository 16. Video upload component 27 may transmit the requested video 43 to remote computer device 106.

Display 46 may present the requested videos 43 so that users of the system may view the requested videos 43. In an implementation, display 46 may provide a video preview 50 of the requested videos 43 so that users may have an opportunity to preview the requested videos 43 before making a decision whether to purchase the requested videos 43. For example, if the video preview 50 indicated that the requested video 43 may not have relevant information for the critical event 22 and/or may be duplicative of information already received for the critical event 22, a user may decide not to purchase the requested video 43. However, if the video preview 50 indicated that the requested video 43 may have relevant information for the critical event 22, a user may select to purchase the requested video 43.

As such, users of system 100 may search for videos captured by camera systems 109 on one or more fleet vehicles 110 to provide an alternative view of and/or additional relevant information, for example, for a critical event 22 and/or specified location.

Figure 2:
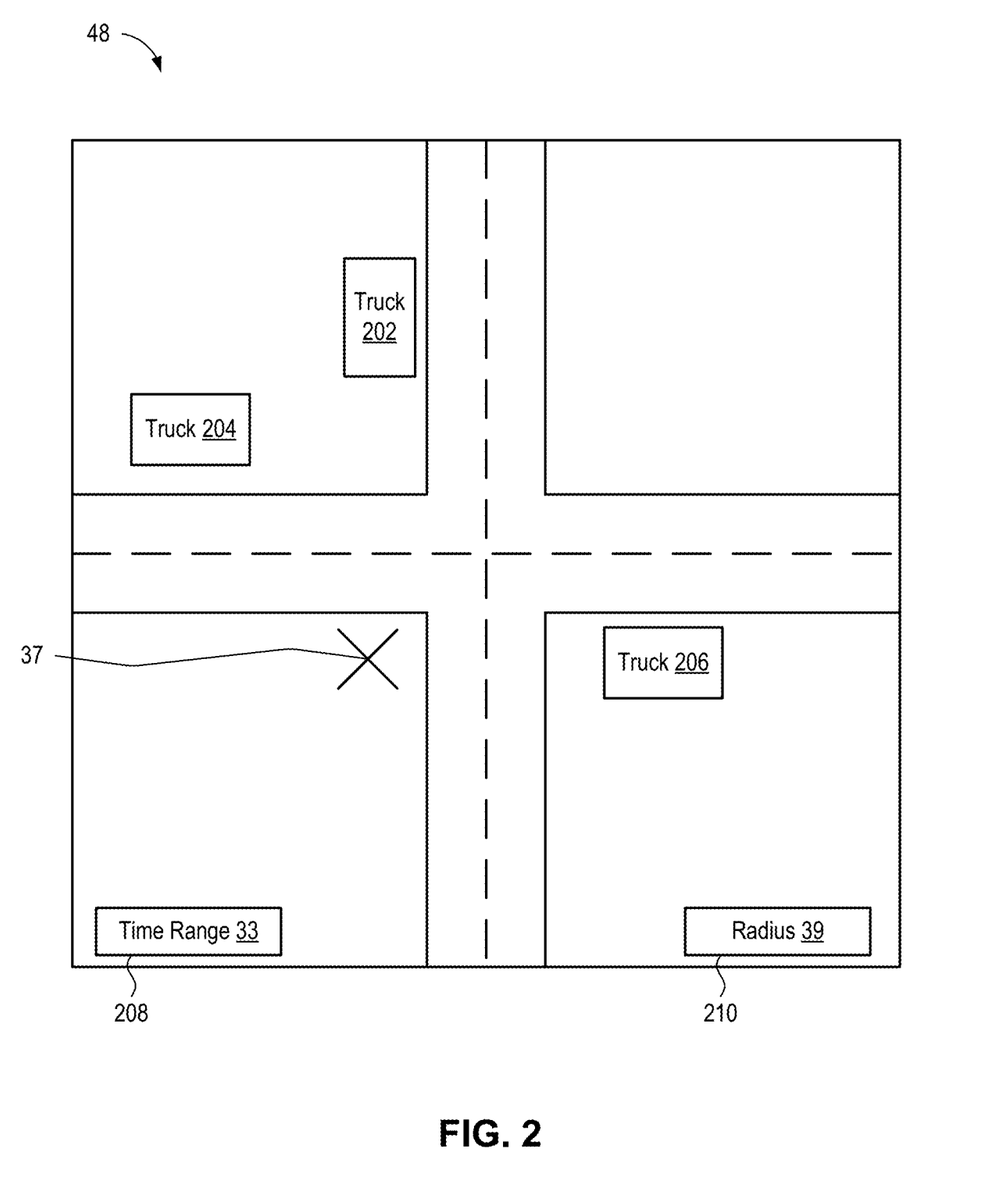
FIG. 2 is a schematic diagram of a map illustrating a search result list of nearby vehicles to an event in accordance with an implementation of the present disclosure.

Referring now to FIG. 2, an example map 48 illustrating a search result list 38 (FIG. 1) for a critical event 22 that occurred at the critical event location 37. The search result list 38 may include three additional fleet vehicles (truck 202, truck 204, and truck 206) in the area nearby the critical event location 37. Map 48 may illustrate the respective positions and/or travel directions of truck 202, truck 204, and truck 206 relative to the critical event location 37. For example, truck 206 may be located in front of the critical event location 37, truck 204 may be traveling in the opposite direction of the critical event location 37, and truck 202 may be traveling towards the critical event location 37.

Map 48 may also display the time range 33 and/or search radius 39 for the search result list 38. In an implementation, a user may update the search results presented on map 48 by modifying the time range 33 and/or the radius 39 of the area surrounding the critical event 22. For example, a user may select a slider and/or other icon 208 on map 48 to adjust the time range 33 (e.g., increase and/or decrease the time range 33). In addition, a user may select a slider and/or other icon 210 on map 48 to adjust the search radius 39 (e.g., increase and/or decrease). As such, the search result list 38 displayed on map 48 may dynamically update based upon changes in the time range 33 and/or search radius 39.

A user may select one or more trucks 202, 204, and 206 to request videos of the critical event 22. For example, rear facing cameras on truck 204 and/or truck 206 may have captured an alternative and/or different view of the critical event 22. In addition, a front facing camera on truck 202 may have captured an alternative and/or different view of the critical event 22. Trucks 202, 204, and 206 may be from the same fleet of vehicles and/or organization of the vehicle(s) involved in the critical event 22 and/or trucks 202, 204, and 206 may from a third party separate from the vehicle(s) involved in the critical event 22. As such, users may request third party videos captured by fleet vehicles outside of their organization.

The alternative and/or different views of the critical event 22 may be used, for example, to provide additional information and/or explanations for causes of the critical event 22, provide additional information about obstructions in the roadways, provide additional information of altercations that may have occurred between the drivers after the critical event 22 occurred, and/or any other information that may be relevant to the environment surrounding the critical event 22.

Figure 3A:
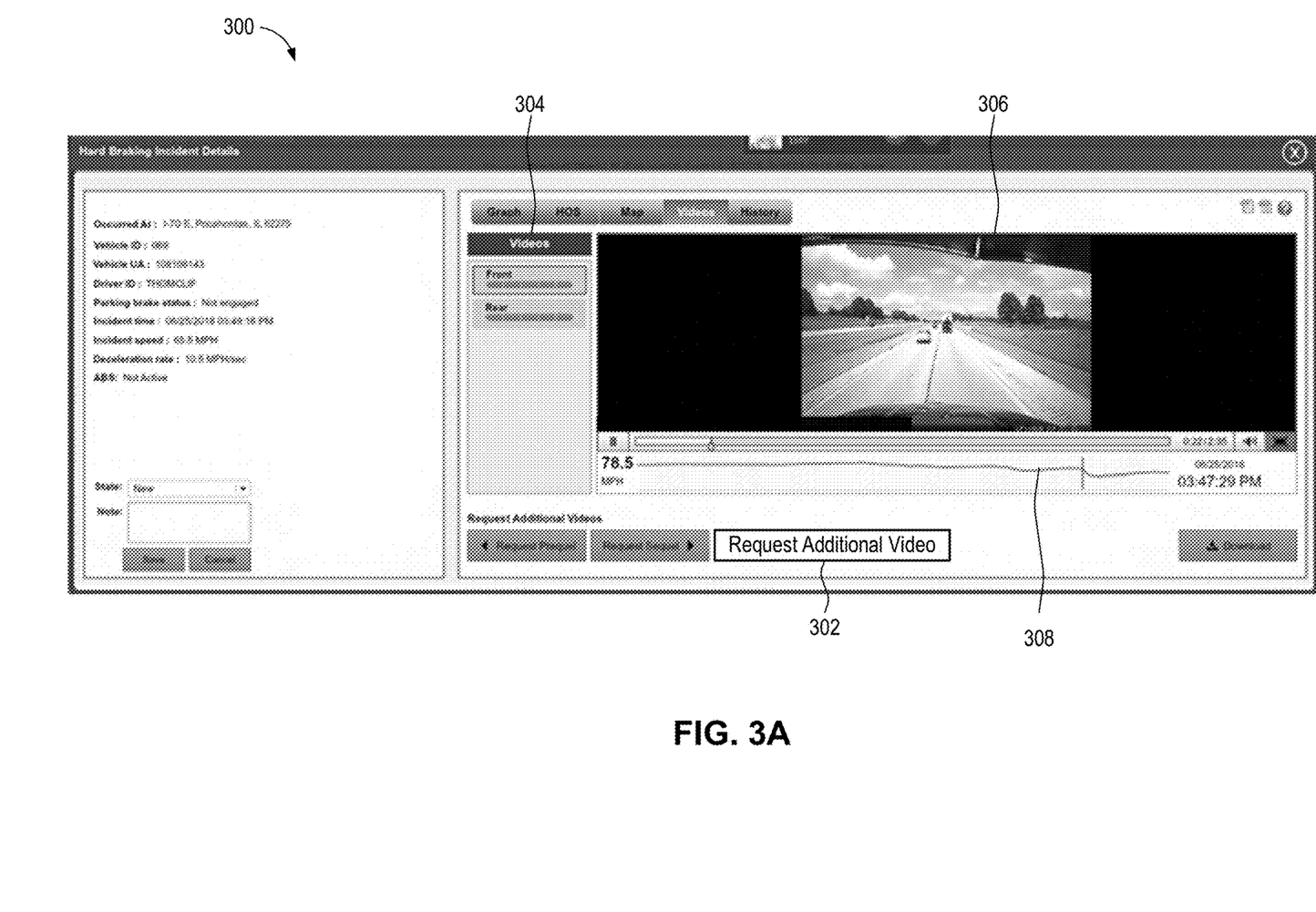
FIGS. 3A and 3B are schematic diagrams of an example user interface for requesting additional videos in accordance with an implementation of the present disclosure.

Referring now to FIG. 3A, an example graphical user interface 300 for requesting additional videos may include a list of videos 304 that a user may select to view. The list of videos 304 may include a camera location on the vehicle (e.g., front facing camera, rear facing camera, and/or interior camera). While the selected video 306 plays, vehicle information 308 that corresponds to the selected video 306 may also be presented. For example, a graph illustrating the vehicle speed may be displayed below the selected video 306.

User interface 300 may also include an icon 302 a user may select to request the additional videos, for example, upon an occurrence of a critical event 22 (FIG. 1). A user may request additional videos for the critical event 22 for different and/or alternative views of the critical event 22. For example, if the cause of the critical event 22 is not readily apparent from the videos associated with the front facing cameras and/or rear facing cameras, a fleet owner may request additional videos for the critical event 22. In addition, a user may request additional videos for the critical event 22 if one or more vehicles involved in the critical event 22 do not have a camera system 109. A user may also request additional videos for a specified time and/or location regardless of whether a critical event 22 occurred.

A user may select which vehicles included in the search result list 38 (FIG. 1) to request the additional videos from. In an implementation, the system may automatically select which vehicles included in the search result list 38 to request the additional videos from. For example, the system may determine that a truck travelling behind a truck that was in an accident event may have captured additional relevant video for the accident and may automatically request the additional video from the truck.

Figure 3B:
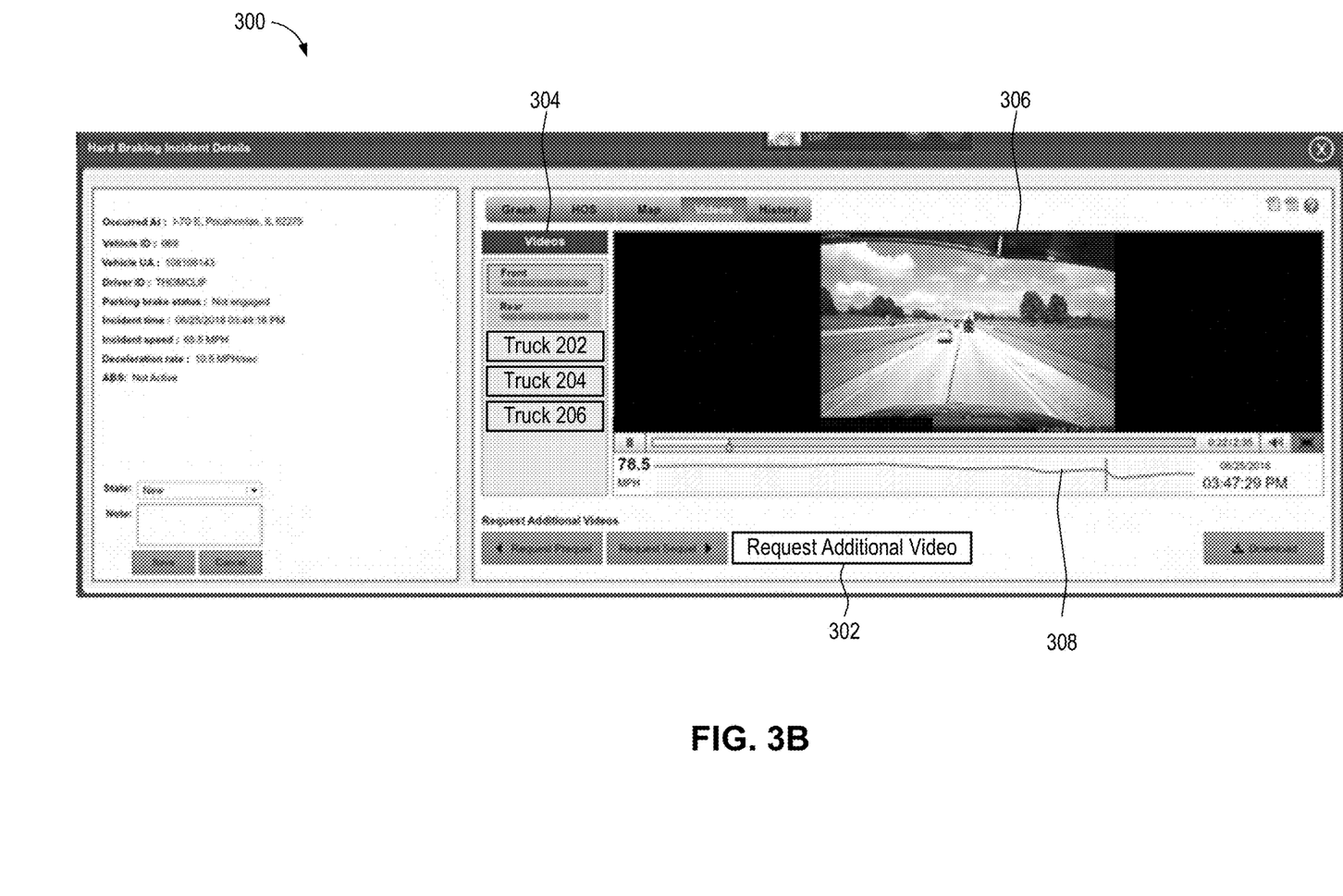

Referring now to FIG. 3B, user interface 300 may include an updated list of videos 304 with the additional requested videos, e.g., truck 202, truck 204, and truck 206. The user may select an induvial truck and view the selected video 306.

The requested videos, when deemed relevant to the critical event, for example, upon review by users of the system, may be attached as an additional videos for the critical event record so that they may become part of the critical event record and may be accessed directly from the critical event record.

Figure 4:
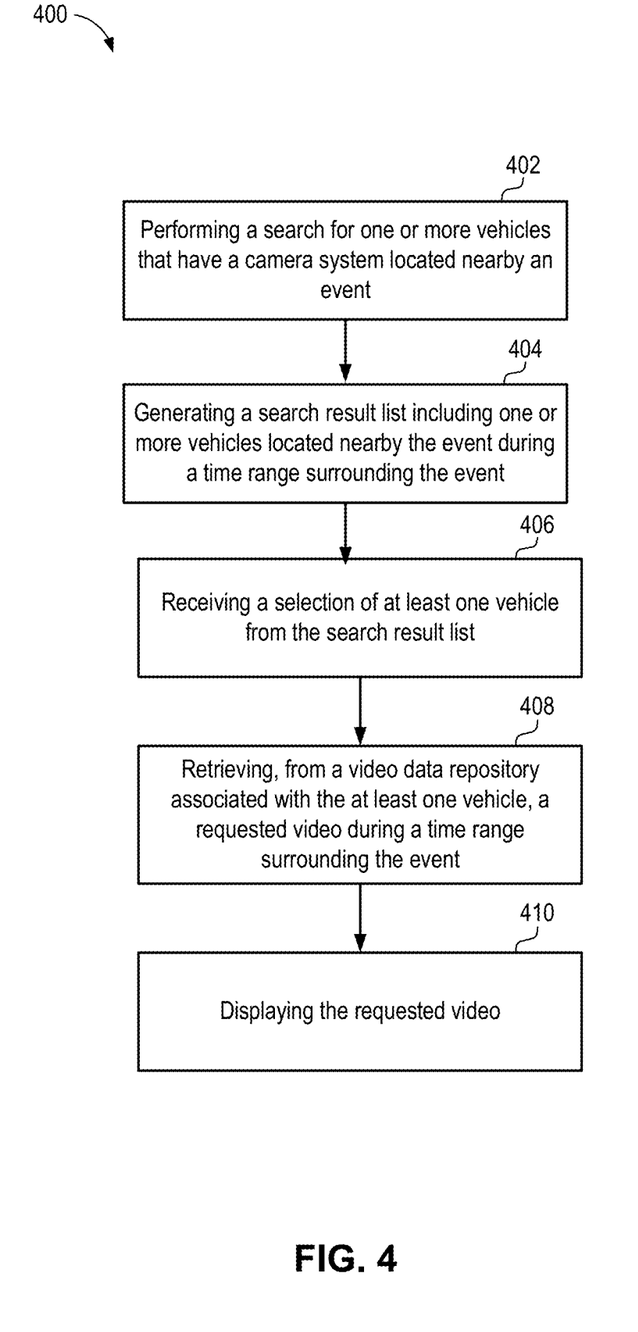
FIG. 4 is an example method flow for requesting videos in accordance with an implementation of the present disclosure.

Referring now to FIG. 4, a method 400 for requesting videos by remote computer device 106 (FIG. 1) in communication with on-board computer device 102 (FIG. 1) is discussed in connection with the description of the architecture of FIG. 1.

At 402, method 400 may include performing a search for one or more vehicles that have a camera system located nearby an event. There may be additional fleet vehicles 110 with video recording capabilities in the area at the time 35 of the critical event 22. Examples of a critical event 22 may include, but are not limited to, one or any combination of a collision, hard braking, the use of the anti-lock braking system (ABS), roll stability state, a lane departure warning, and a following time violation. As such, videos 36 captured by the one or more fleet vehicles 110 may provide an alternative view of the critical event 22 and/or may have captured additional relevant information for the critical event 22.

Video manager 32 may analyze position data of fleet vehicles 110 equipped with camera systems 109 to identify whether any fleet vehicles 110 were located nearby the critical event 22 when the critical event 22 occurred. Video manager 32 may receive the time 35 and location 37 of the critical event 22 automatically from critical event controller 25 and may automatically perform the video search request 34 for videos 36 upon the occurrence of the critical event 22.

In addition, video manager 32 may generate a video search request 34 to search for videos 36 captured by a camera system 109 on one or more fleet vehicles 110 located nearby a critical event 22. In addition, video manager 32 may perform the video search request 34 for videos 36 in response to a user request. For example, the user request may be for videos 36 associated with a critical event 22 and/or for videos 36 associated with a specific date and/or time 35 regardless of whether a critical event 22 occurred.

Fleet vehicles 110 in the area may be from the same company and/or organization of the fleet vehicle(s) 110 involved in the critical event 22 and/or may be from different companies and/or organizations of the fleet vehicle(s) 110 involved in the critical event 22. As such, the videos 36 may come from a third party not involved in the critical event 22.

At 404, method 400 may include generating a search result list including one or more vehicles located nearby the event during a time range surrounding the event. For example, video manager 32 may compare the location 37 and time 35 information included in the video search request 34 with the location information 15 of the fleet vehicles 110 associated with the system 100. In an implementation, a radius 39 from the critical event location 37 may be set (e.g., a half mile or a mile) to search within when identifying which fleet vehicles 110 are nearby the critical event location 37. In addition, a time range 33 (e.g., one minutes) extending before and/or after the time 35 when the critical event 22 occurred may also be used whining searching for which fleet vehicles 110 may have been nearby when the critical event 22 occurred.

The radius 39 and/or time range 33 may be configurable by users of the system. For example, the radius 39 may be expanded to receive additional search results and/or narrowed to reduce the search results. In addition, the time range 33 may be increased to include additional search results and/or may be decreased to reduce the search results. For example, the time range 33 may be expanded to 20 minutes after the critical event 22 occurred if a user wanted to search for videos 36 to show events that may have occurred before an office arrived at the critical event location 37.

When the location information 15 of a fleet vehicle 110 is within a radius 39 of the critical event location 37 and within a time range 33 of the time 35 of when the critical event 22 occurred, the vehicle ID 12 of the fleet vehicle 110 may be added to a search result list 38. As such, the search result list 38 may include one or more vehicles IDs 12 of fleet vehicles 110 that were in the area nearby the critical event location 37 when the critical event 22 occurred.

At 406, method 400 may include receiving a selection of at least one vehicle from the search result list. Video manager 32 may receive the selected vehicle ID(s) 12 for requesting the videos 36. In an implementation, video manager 32 may automatically select one or more vehicle IDs 12 from the search result list 38 for requesting the videos 36 upon the occurrence of the critical event 22.

In an implementation, the search result list 38 may be presented in the form of a map 48 illustrating a location of the one or more fleet vehicles 110 relative to the critical event location 37. Map 48 may be an interactive map displaying the one or more fleet vehicles 110 included in the search result list 38. Users may select one or more fleet vehicles 110 to request the video 36 from using map 48. In addition, users may modify the time range 33 and/or radius 39 of the search results list 38 illustrated on the map 48.

At 408, method 400 may include retrieving, from a video data repository associated with the at least one vehicle, a requested video during a time range surrounding the event. Video manager 32 may prepare one or more video requests 42 to send to the selected vehicles IDs 12. Video upload component 27 associated with on-board computer device 102 may receive the video request 42 from video manager 32 and may retrieve the video 10 associated with the requested time 35 from the video data repository 16. Video upload component 27 may transmit the requested video 43 to remote computer device 106.

At 410, method 400 may include displaying the requested video. Display 46 may present the requested videos 43 so that users of the system may view the requested videos 43. In an implementation, display 46 may provide a video preview 50 of the requested videos 43 so that users may have an opportunity to preview the requested videos 43 before making a decision whether to purchase the requested videos 43.

Method 400 may allow users to search for videos captured by camera systems of other fleet vehicles that may be located nearby an event and/or requested location. The videos captured may provide an alternative view of the event or location and/or may have captured additional relevant information for the event. Thus, users may receive reliable information to help identify a cause of the event, help defend a driver who was involved in an accident, and/or to identify unacceptable driving behaviors.

Figure 5:
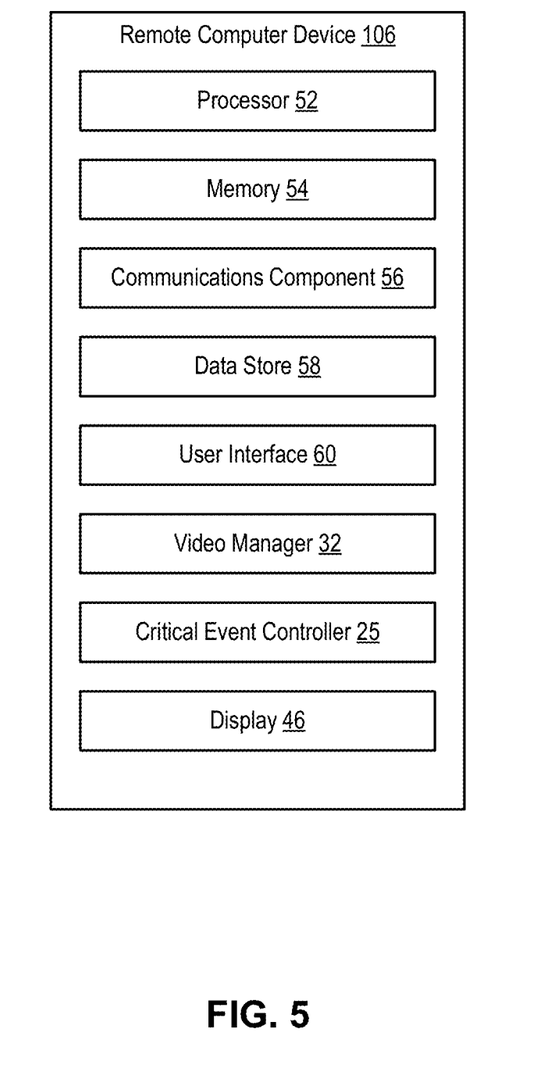
FIG. 5 is a schematic block diagram of an example computer device in accordance with an implementation of the present disclosure.

Referring now to FIG. 5, illustrated is an example remote computer device 106 in accordance with an implementation, including additional component details as compared to FIG. 1. In one example, remote computer device 106 may include processor 52 for carrying out processing functions associated with one or more of components and functions described herein. Processor 52 can include a single or multiple set of processors or multi-core processors. Moreover, processor 52 can be implemented as an integrated processing system and/or a distributed processing system.

Remote computer device 106 may further include memory 54, such as for storing local versions of applications being executed by processor 52. Memory 54 can include a type of memory usable by a computer, such as random access memory (RAM), read only memory (ROM), tapes, magnetic discs, optical discs, volatile memory, non-volatile memory, and any combination thereof.

Further, remote computer device 106 may include a communications component 56 that provides for establishing and maintaining communications with one or more parties utilizing hardware, software, and services as described herein. Communications component 56 may carry communications between components on remote computer device 106, as well as between remote computer device 106 and external devices, such as devices located across a communications network and/or devices serially or locally connected to remote computer device 106. For example, communications component 56 may include one or more buses, and may further include transmit chain components and receive chain components associated with a transmitter and receiver, respectively, operable for interfacing with external devices.

Additionally, remote computer device 106 may include a data store 58, which can be any suitable combination of hardware and/or software, that provides for mass storage of information, databases, and programs employed in connection with implementations described herein. For example, data store 58 may be a data repository for video manager 32 (FIG. 1), critical event controller 25 (FIG. 1), and/or display 46 (FIG. 1).

Remote computer device 106 may also include a user interface component 60 operable to receive inputs from a user of remote computer device 106 and further operable to generate outputs for presentation to the user. User interface component 60 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 60 may include one or more output devices, including but not limited to a display, a speaker, a haptic feedback mechanism, a printer, any other mechanism capable of presenting an output to a user, or any combination thereof.

In an implementation, user interface component 60 may transmit and/or receive messages corresponding to the operation of video manager 32, critical event controller 25, and/or display 46. In addition, processor 52 executes video manager 32, critical event controller 25, and/or display 46, and memory 54 or data store 58 may store them.

Figure 6:
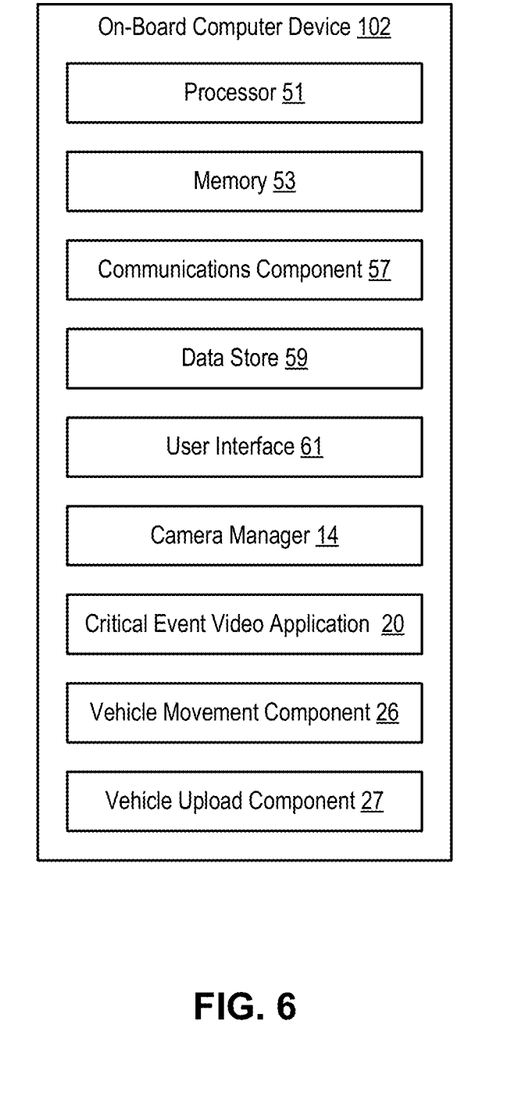
FIG. 6 is a schematic block diagram of an example computer device for controlling a camera in a vehicle in accordance with an implementation of the present disclosure.

Referring now to FIG. 6, illustrated is an example on-board computer device 102 in accordance with an implementation, including additional component details as compared to FIG. 1. In one example, on-board computer device 102 may include processor 51 for carrying out processing functions associated with one or more of components and functions described herein. Processor 51 can include a single or multiple set of processors or multi-core processors. Moreover, processor 51 can be implemented as an integrated processing system and/or a distributed processing system.

On-board computer device 102 may further include memory 53, such as for storing local versions of applications being executed by processor 51. Memory 53 can include a type of memory usable by a computer, such as random access memory (RAM), read only memory (ROM), tapes, magnetic discs, optical discs, volatile memory, non-volatile memory, and any combination thereof.

Further, on-board computer device 102 may include a communications component 57 that provides for establishing and maintaining communications with one or more parties utilizing hardware, software, and services as described herein. Communications component 57 may carry communications between components on on-board computer device 102, as well as between on-board computer device 102 and external devices, such as devices located across a communications network and/or devices serially or locally connected to on-board computer device 102. For example, communications component 57 may include one or more buses, and may further include transmit chain components and receive chain components associated with a transmitter and receiver, respectively, operable for interfacing with external devices.

Additionally, on-board computer device 102 may include a data store 59, which can be any suitable combination of hardware and/or software, that provides for mass storage of information, databases, and programs employed in connection with implementations described herein. For example, data store 59 may be a data repository for camera manager 14 (FIG. 1), critical event video application 20 (FIG. 1), vehicle movement component 26 (FIG. 1) and/or vehicle upload component 27 (FIG. 1).

On-board computer device 102 may also include a user interface component 61 operable to receive inputs from a user of on-board computer device 102 and further operable to generate outputs for presentation to the user. User interface component 61 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 61 may include one or more output devices, including but not limited to a display, a speaker, a haptic feedback mechanism, a printer, any other mechanism capable of presenting an output to a user, or any combination thereof.

In an implementation, user interface component 61 may transmit and/or receive messages corresponding to the operation of camera manager 14, critical event video application 20, vehicle movement component 26, and/or vehicle upload component 27. In addition, processor 51 executes camera manager 14, critical event video application 20, vehicle movement component 26, and/or vehicle upload component 27, and memory 53 or data store 59 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
    a memory to store data and instructions;
    a processor in communication with the memory; and
    a video manager in communication with the memory and the processor, wherein the video manager is operable to:
        perform a search, regarding a first vehicle having a first driver and associated with an event, for one or more second vehicles that have a camera system located nearby the event during a time range surrounding the event, wherein the search is automatically performed in response to an on-board computer device of the first vehicle detecting an occurrence of the event and uploading time and location of the event from the first vehicle;
        receive, via a user interface of the computer device, a selection of at least one second vehicle from a search result list including the one or more second vehicles, wherein the search result list is generated from the performed search based on the time and the location of the event and the event being a critical event including one or more of hard braking, use of anti-lock braking system (ABS), roll stability state, a lane departure warning, and a following time violation;
        retrieve, from a video data repository associated with the at least one second vehicle of the one or more second vehicles, a requested video during the time range surrounding the event; and
        display the requested video on a display of the computer device,
        wherein the computer device is remote from the first vehicle and the one or more second vehicles.

2. The computer device of claim 1, wherein the event involved at least one vehicle without video recording capability.

3. The computer device of claim 1, wherein the search result list is displayed using a map showing a location of the one or more second vehicles in relation to an event location.

4. The computer device of claim 3, wherein the selection of the at least one second vehicle is performed using the map.

5. The computer device of claim 3, wherein the map further includes a time search feature where the one or more second vehicles displayed on the map changes as the time range selected changes.

6. The computer device of claim 3, wherein the map further includes a radius search feature where the one or more second vehicles displayed on the map changes as the radius changes.

7. The computer device of claim 1, wherein the requested video is associated with a record for the critical event.

8. A method for requesting videos by a computer device, comprising:
    performing a search, regarding a first vehicle having a first driver and associated with an event, for one or more second vehicles that have a camera system located nearby an event during a time range surrounding the event, wherein the search is automatically performed in response to an on-board computer device of the first vehicle detecting an occurrence of the event and uploading time and location of the event from the first vehicle;
    receiving, via a user interface of the computer device, a selection of at least one second vehicle from a search result list including the one or more second vehicles, wherein the search result list is generated from the performed search based on the time and the location of the event and the event being a critical event including one or more of hard braking, use of anti-lock braking system (ABS), roll stability state, a lane departure warning, and a following time violation;
    retrieving, from a video data repository associated with the at least one second vehicle of the one or more second vehicles, a requested video during the time range surrounding the event; and
    displaying the requested video on a display of the computer device,
    wherein the computer device is remote from the first vehicle and the one or more second vehicles.

9. The method of claim 8, wherein the event involved at least one vehicle without video recording capability.

10. The method of claim 8, wherein the search result list is displayed using a map showing a location of the one or more second vehicles in relation to an event location.

11. The method of claim 10, wherein the selection of the at least one second vehicle is performed using the map.

12. The method of claim 10, wherein the map further includes a time search feature where the one or more second vehicles displayed on the map changes as the time range selected changes.

13. The method of claim 10, wherein the map further includes a radius search feature where the one or more second vehicles displayed on the map changes as the radius changes.

14. The method of claim 8, wherein the requested video is associated with a record for the critical event.

15. A non-transitory computer-readable medium storing instructions executable by a computer device, comprising:

at least one instruction for causing the computer device to perform a search, regarding a first vehicle having a first driver and associated with an event, for one or more second vehicles that have a camera system located nearby an event during a time range surrounding the event, wherein the search is automatically performed in response to an on-board computer device of the first vehicle detecting an occurrence of the event and uploading time and location of the event from the first vehicle;

at least one instruction for causing the computer device to receive, via a user interface of the computer device, a selection of at least one second vehicle from a search result list including the one or more second vehicles, wherein the search result list is generated from the performed search based on the time and the location of the event and the event being a critical event including one or more of hard braking, use of anti-lock braking system (ABS), roll stability state, a lane departure warning, and a following time violation;

at least one instruction for causing the computer device to retrieve, from a video data repository associated with the at least one second vehicle of the one or more second vehicles, a requested video during the time range surrounding the event; and at least one instruction for causing the computer device to display the requested video on a display of the computer device, wherein the computer device is remote from the first vehicle and the one or more vehicles.

16. The non-transitory computer-readable medium of claim 15, wherein the search result list is displayed using a map showing a location of the one or more second vehicles in relation to an event location.

17. The non-transitory computer-readable medium of claim 16, wherein the selection of the at least one second vehicle is performed using the map.

18. The non-transitory computer-readable medium of claim 16, wherein the map further includes a time search feature where the one or more second vehicles displayed on the map changes as the time range selected changes.

19. The non-transitory computer-readable medium of claim 16, wherein the map further includes a radius search feature where the one or more second vehicles displayed on the map changes as the radius changes.

* * * * *